(12) United States Patent
Kawabe et al.

(10) Patent No.: US 9,429,649 B2
(45) Date of Patent: Aug. 30, 2016

(54) RADAR DEVICE

(71) Applicant: FUJITSU TEN LIMITED, Kobe-shi, Hyogo (JP)

(72) Inventors: Seiji Kawabe, Kobe (JP); Hisateru Asanuma, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 358 days.

(21) Appl. No.: 13/760,324

(22) Filed: Feb. 6, 2013

(65) Prior Publication Data

US 2013/0241763 A1    Sep. 19, 2013

(30) Foreign Application Priority Data

Mar. 19, 2012   (JP) .................................. 2012-062869

(51) Int. Cl.
| | |
|---|---|
| *G01S 13/93* | (2006.01) |
| *G01S 13/34* | (2006.01) |
| *G01S 7/35* | (2006.01) |
| *G01S 13/58* | (2006.01) |

(52) U.S. Cl.
CPC .............. *G01S 13/34* (2013.01); *G01S 7/354* (2013.01); *G01S 13/345* (2013.01); *G01S 13/584* (2013.01); *G01S 13/931* (2013.01); *G01S 2013/9375* (2013.01)

(58) Field of Classification Search
CPC ..................... G01S 13/931; G01S 2013/9375; G01S 7/023; G01S 13/34; G01S 7/354
USPC .......................................................... 342/70
See application file for complete search history.

(56) References Cited

U.S. PATENT DOCUMENTS

| | | | | |
|---|---|---|---|---|
| 6,037,895 A * | 3/2000 | Uehara | ................... | G01S 7/034 342/104 |
| 7,151,482 B2 * | 12/2006 | Natsume | ................. | H01Q 3/24 342/118 |
| 8,085,184 B2 * | 12/2011 | Takabayashi | ......... | G01S 13/343 342/104 |
| 8,223,064 B2 * | 7/2012 | Szajnowski | ........... | G01R 23/02 342/159 |
| 8,503,265 B2 * | 8/2013 | Akiyama | .............. | G01S 7/5273 340/435 |
| 8,847,815 B2 * | 9/2014 | Kanamoto | ............... | G01S 3/74 342/118 |

(Continued)

FOREIGN PATENT DOCUMENTS

| | | |
|---|---|---|
| JP | H11-002677 A | 1/1999 |
| JP | 2004-198438 A | 7/2004 |
| JP | A-2011-47806 | 3/2011 |

OTHER PUBLICATIONS

Office Action issued in Chinese Application No. 201310076343.1 dated Sep. 1, 2014 (with translation).

(Continued)

*Primary Examiner* — John B Sotomayor
*Assistant Examiner* — Marcus Windrich
(74) *Attorney, Agent, or Firm* — Oliff PLC

(57) ABSTRACT

According to an embodiment, there is provided a radar device including a generating unit, an estimating unit, and a determining unit. The generating unit generates a frequency spectrum from a beat signal corresponding to a predetermined period. The estimating unit estimates a peak frequency corresponding to a target on the basis of location information of the target corresponding to a past period. The determining unit determines, with respect to the frequency spectrum corresponding to the latest period, whether the peak frequency is a peak corresponding to the target by comparing power near the peak frequency estimated by the estimating unit with a predetermined threshold.

5 Claims, 7 Drawing Sheets

(56) References Cited

U.S. PATENT DOCUMENTS

| | | | | |
|---|---|---|---|---|
| 8,928,523 B2* | 1/2015 | Lee | | G01S 7/023 342/159 |
| 2004/0252047 A1* | 12/2004 | Miyake | | G01S 13/34 342/107 |
| 2006/0250297 A1* | 11/2006 | Prakah-Asante | ... | B60R 21/0134 342/70 |
| 2009/0096661 A1* | 4/2009 | Sakamoto | | G01S 7/021 342/92 |
| 2009/0289831 A1* | 11/2009 | Akita | | G01S 7/023 342/70 |
| 2011/0006941 A1* | 1/2011 | Samukawa | | G01S 13/345 342/70 |
| 2011/0205102 A1* | 8/2011 | Shibata | | G01S 13/345 342/70 |
| 2013/0038484 A1* | 2/2013 | Ohkado | | G01S 13/345 342/70 |
| 2013/0093613 A1* | 4/2013 | Itoh | | G01S 13/345 342/70 |

OTHER PUBLICATIONS

Dec. 15, 2015 Office Action issued in Japanese Application No. 2012-062869.

\* cited by examiner

| TARGET IDENTIFIER | DISTANCE | RELATIVE VELOCITY | ANGLE | PRIORITY |
|---|---|---|---|---|
| TG1 | X1 | V1 | $\theta 1$ | 1 |
| TG2 | X2 | V2 | $\theta 2$ | 2 |
| ⋮ | ⋮ | ⋮ | ⋮ | ⋮ |

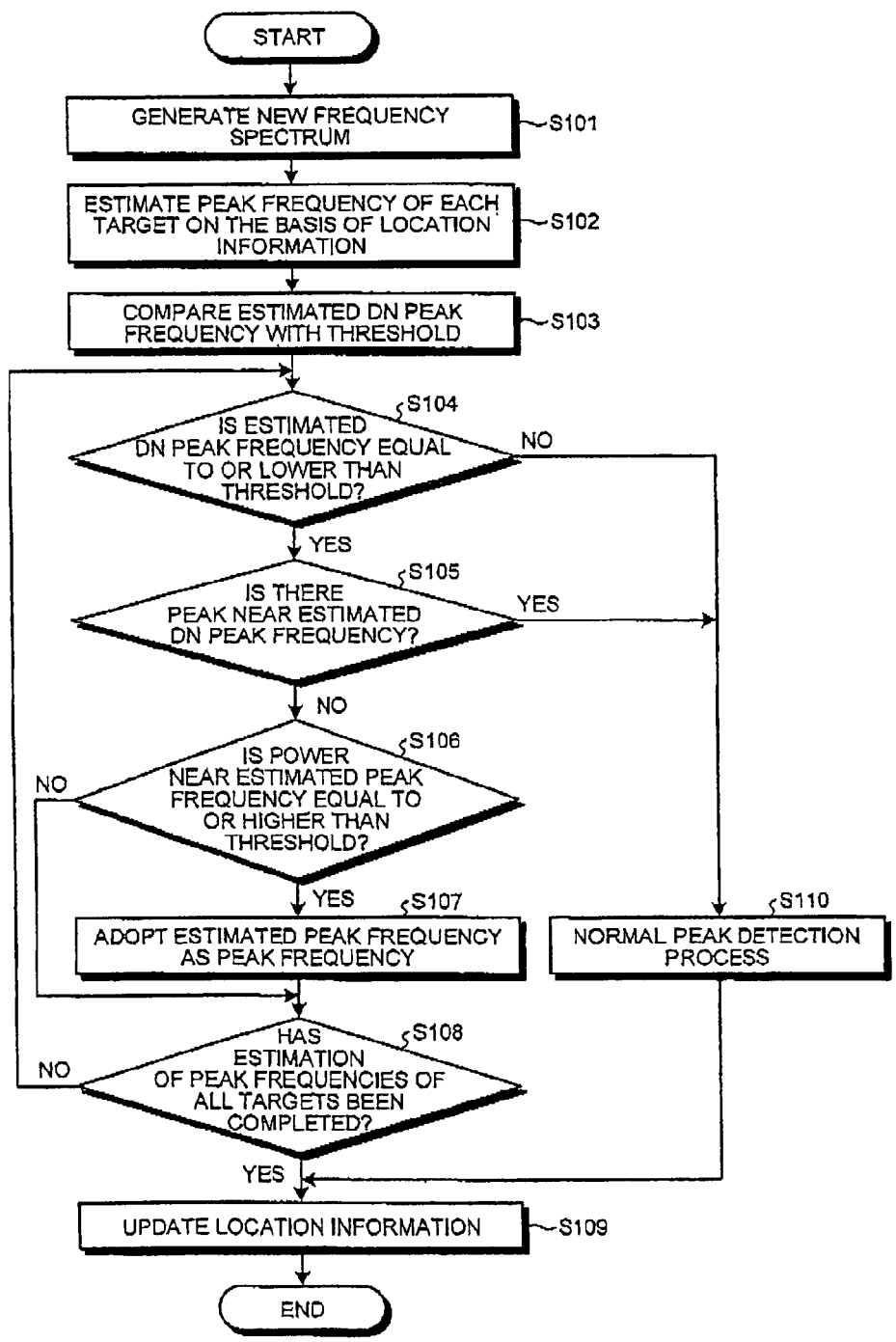

RADAR DEVICE

CROSS-REFERENCE TO RELATED APPLICATION

This application is based upon and claims the benefit of priority of the prior Japanese Patent Application No. 2012-062869, filed on Mar. 19, 2012, the entire contents of which are incorporated herein by reference.

BACKGROUND OF THE INVENTION

1. Field of the Invention

The embodiment discussed herein relates to a radar device.

2. Description of the Related Art

Conventionally, there is known a radar device that transmits a frequency-modulated continuous-wave signal and calculates a distance to a target and a relative velocity to the target from a difference in frequency between a transmission wave and a reflected wave.

As such a radar device, there has been proposed a radar device that detects a target on the basis of peaks of powers at respective frequencies obtained as a result of frequency analysis of a received signal (hereinafter, referred to as a "frequency spectrum") (for example, see Japanese Patent Application Laid-open No. 2011-47806).

However, the above-described conventional technology has a problem that it is difficult to detect a target at a short distance from the radar device.

Specifically, peaks on a frequency spectrum may include not only a peak corresponding to a target but also a harmonic wave peak corresponding to a frequency of an integral multiple of a frequency of the peak. In this case, as a distance to the target is shorter, a difference in frequency between peaks is smaller, thus the peaks overlap with each other.

Therefore, when a target exists at a short distance from the radar device, a peak corresponding to the target is hidden by a harmonic wave peak, which makes it difficult to detect the target. Incidentally, this problem is likely to be exposed in a case of tracking control of an object being at a short distance from the radar device as a target like vehicle congestion tracking.

SUMMARY OF THE INVENTION

A radar device according to an embodiment includes a generating unit, an estimating unit and a determining unit. The generating unit generates a frequency spectrum from a beat signal corresponding to a predetermined period. The estimating unit estimates a peak frequency corresponding to a target on the basis of location information of the target corresponding to a past period. The determining unit determines, with respect to the frequency spectrum corresponding to the latest period, whether the peak frequency is a peak corresponding to the target by comparing power near the peak frequency estimated by the estimating unit (13d) with a predetermined threshold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a flowchart illustrating a procedure of a process performed by the radar device.

DETAILED DESCRIPTION OF THE PREFERRED EMBODIMENT

An exemplary embodiment of a radar device according to the present invention is explained in detail below with reference to accompanying drawings. In the embodiment described below, there is described a case of using a so-called FM-CW (Frequency Modulated Continuous Wave) system out of various millimeter-wave radar systems. Incidentally, the FM-CW system will be described later with reference to FIGS. 4A and 4B.

Figure 1:
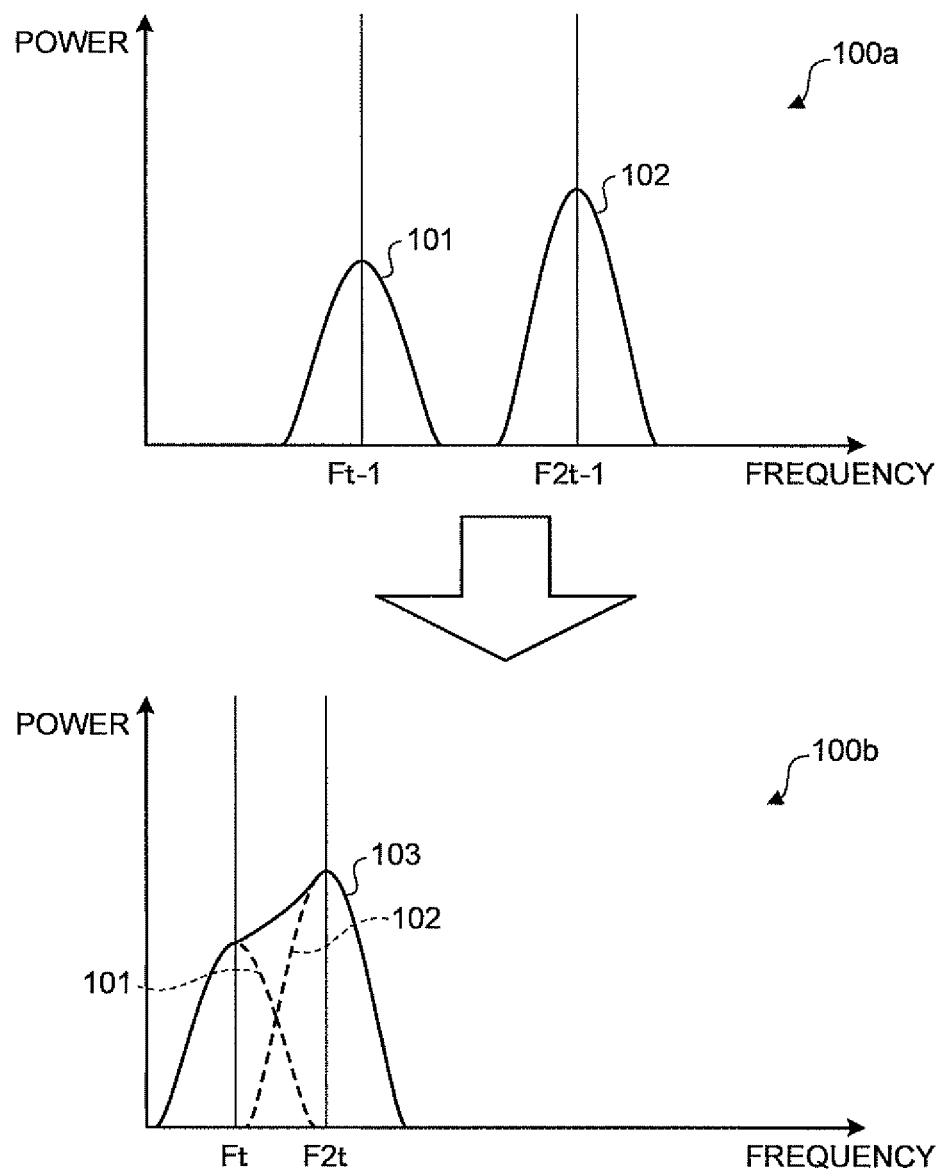
FIG. 1 is an explanatory diagram illustrating a relation between a true target peak and a harmonic wave peak.

First, a peak detection method according to the present embodiment is explained with reference to FIGS. 1 and 2. FIG. 1 is an explanatory diagram illustrating a relation between a true target peak and a harmonic wave peak, and FIG. 2 is an explanatory diagram of the peak detection method according to the present embodiment.

Figure 2:
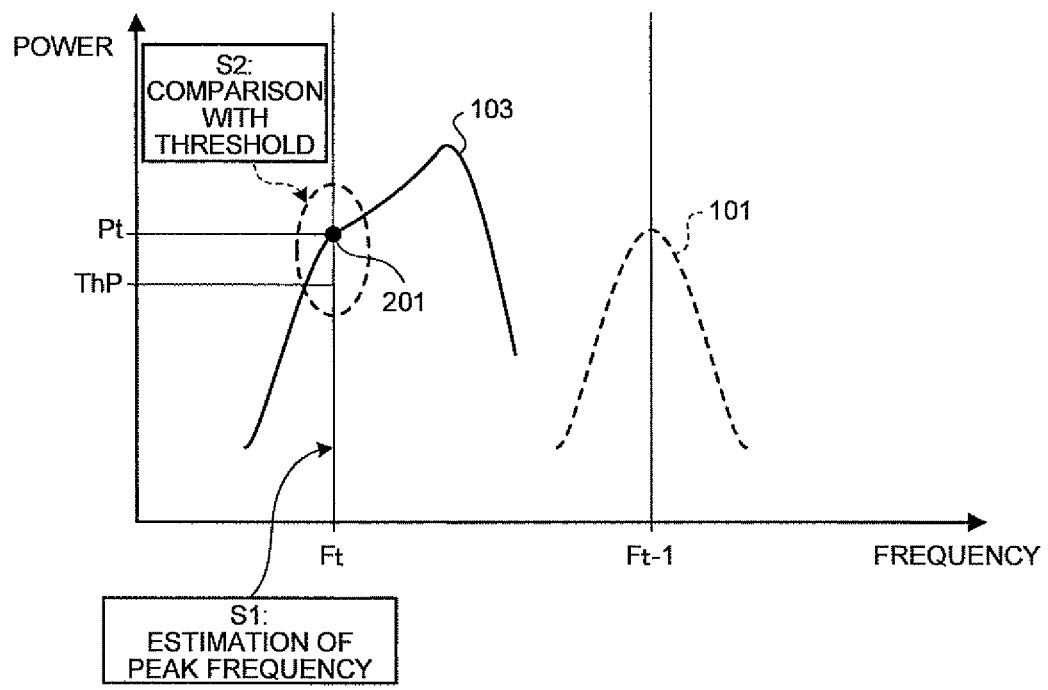
FIG. 2 is an explanatory diagram of a peak detection method according to a present embodiment.

FIGS. 1 and 2 illustrate schematic graphs of a "frequency spectrum" obtained by synthesizing a transmission wave which is frequency-modulated into a so-called triangle wave and a reflected wave that the transmission wave is reflected by a target and then performing frequency analysis on the synthesized wave.

The graphs in FIGS. 1 and 2 plot "frequency" on the abscissa and "power" on the ordinate. Incidentally, a "frequency" on the abscissa can be a frequency normalized by predetermined frequency width.

For the sake of simplicity, FIGS. 1 and 2 illustrate a case of one target. Incidentally, FIGS. 1 and 2 illustrate only a harmonic wave peak corresponding to a second harmonic wave out of harmonic wave peaks.

As illustrated in FIG. 1, a frequency spectrum 100a is a spectrum at time "t−1", and a frequency spectrum 100b is a spectrum at time "t". Incidentally, a difference between the times "t" and "t−1" (i.e., a timestep) is, for example, T (a fixed value).

"F" denotes a frequency corresponding to a true peak, and "F2" denotes a frequency corresponding to a second harmonic wave. Furthermore, "t−1" denotes that it corresponds to the spectrum at the time "t−1", and "t" denotes that it corresponds to the spectrum at the time "t".

As illustrated in the frequency spectrum 100a in FIG. 1, the frequency spectrum 100a includes a peak 101, which is a true peak corresponding to a target, and a peak 102, which is a harmonic wave peak of the true peak. A frequency of the peak 101 is Ft−1, and a frequency of the peak 102 is F2t−1.

Incidentally, in the frequency spectra 100a and 100b, power of the peak 101 is lower than power of the peak 102;

however, this is because a filter that reduces low-frequency power is used as an example, and does not indicate a magnitude relation between respective powers of the peaks.

When the target corresponding to the peak 101 comes close, as illustrated in the frequency spectrum 100b, respective frequencies of the peaks become lower than the values illustrated in the frequency spectrum 100a. As a harmonic wave peak travels faster than a true peak (a frequency decreases greatly), the peaks overlap with each other here.

Therefore, as illustrated in the frequency spectrum 100b, a synthetic wave 103 that the peaks 101 and 102 are synthesized is observed, and thus the true peak 101 is hidden by the synthetic wave 103, which makes it difficult to determine the position (on the frequency axis) of the true peak 101. Namely, it is difficult to find out a peak frequency "Ft" of the true peak 101.

Accordingly, in the peak detection method according to the present embodiment, a peak frequency "Ft" of the true peak 101 is detected according to the following procedure.

As illustrated in FIG. 2, in the peak detection method according to the present embodiment, a frequency "Ft" of the true peak 101 at the time "t" is estimated on the basis of the frequency "Ft−1" of the true peak 101 at the time "t−1" (see Step S1 in FIG. 2). Incidentally, details of frequency estimation will be described later with reference to FIG. 6.

Then, with respect to the synthetic wave 103 at the time "t", power "Pt" at the frequency "Ft" (see a point 201 in FIG. 2) is compared with a predetermined threshold "ThP" (see Step S2 in FIG. 2).

When the power "Pt" is equal to or higher than the predetermined threshold "ThP", a frequency of the true peak 101 at the time "t" is deemed to be the frequency "Ft". Namely, it is deemed that the true peak 101 with the frequency "Ft" exists at the time "t", the frequency "Ft" is treated as a peak frequency corresponding to the target.

In this manner, according to the peak detection method of the present embodiment, even if a peak of a target existing at a short distance is hidden by a harmonic wave peak or a noise and thereby cannot be observed, a peak frequency corresponding to the target can be detected by performing the above-described "deemed process".

Furthermore, in the peak detection method according to the present embodiment, an estimated peak frequency is not adopted directly but is adopted under a condition that power corresponding to the estimated peak frequency is equal to or higher than the predetermined threshold. Therefore, it is possible to avoid a situation where an actually non-existent object is erroneously detected as a target. In other words, it is possible to improve the accuracy of detecting a target existing at a short distance.

Incidentally, in the peak detection method according to the present embodiment, the above-described peak detection is performed individually on each of an UP beat section (see FIG. 4A) and a DN beat section (see FIG. 4A) in a difference wave between a transmission wave and a reflected wave (hereinafter, referred to as a "beat signal"). This will be described later with reference to FIGS. 4A and 4B.

Figure 3:
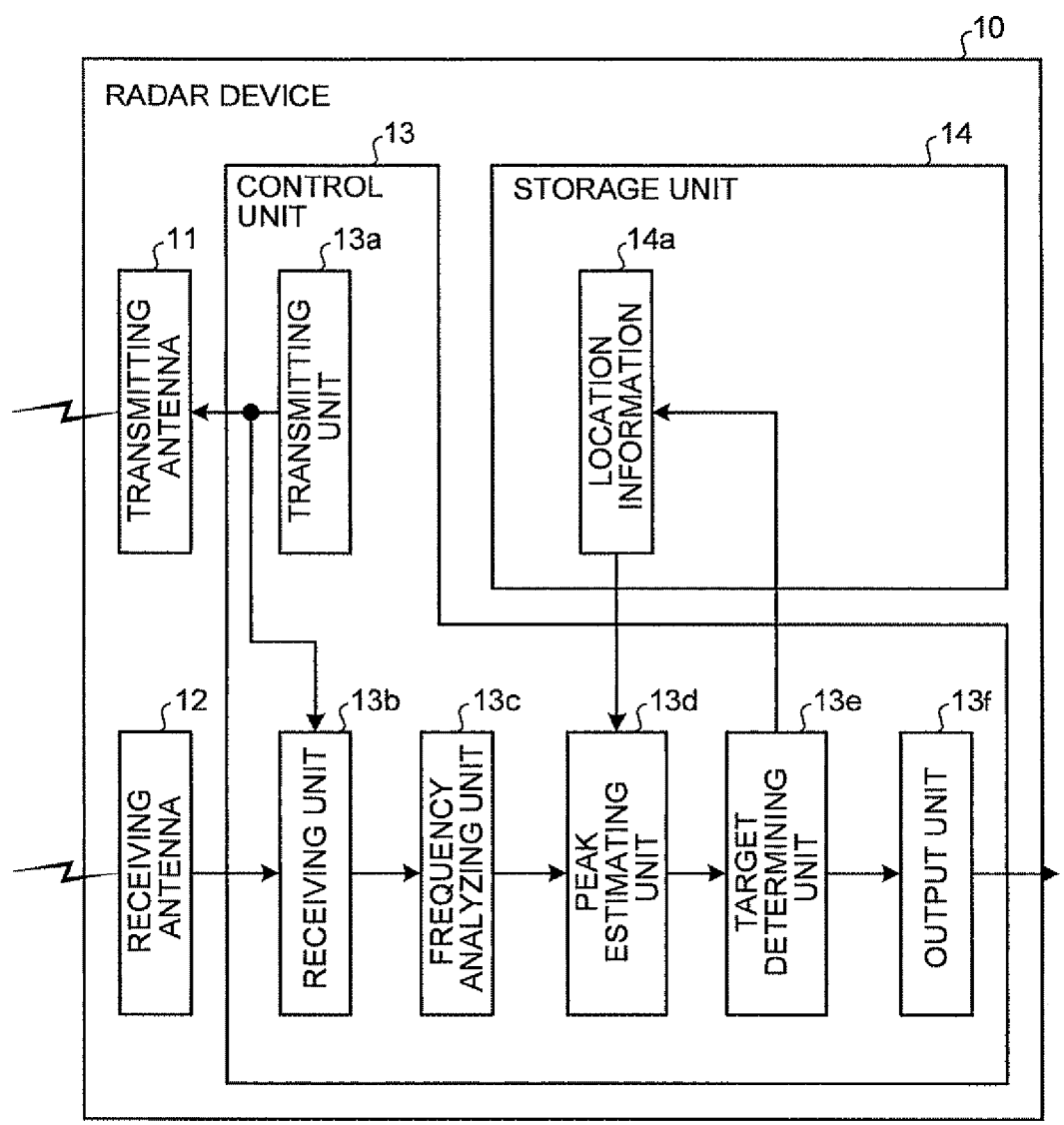
FIG. 3 is a block diagram illustrating a configuration of a radar device.

Subsequently, a configuration example of a radar device according to the present embodiment is explained with reference to FIG. 3. FIG. 3 is a block diagram illustrating a configuration of a radar device 10. Incidentally, for the sake of simplicity, FIG. 3 illustrates a configuration of a part of the radar device 10.

As illustrated in FIG. 3, the radar device 10 includes a transmitting antenna 11, a receiving antenna 12, a control unit 13, and a storage unit 14. The control unit 13 includes a transmitting unit 13a, a receiving unit 13b, a frequency analyzing unit 13c, a peak estimating unit 13d, a target determining unit 13e, and an output unit 13f. The storage unit 14 stores therein location information 14a.

The transmitting antenna 11 is an antenna from which a frequency-modulated continuous wave is transmitted toward a target by the transmitting unit 13a of the control unit 13. A converter (not illustrated), which converts a digital signal generated by the transmitting unit 13a into an analog signal, is placed between the transmitting antenna 11 and the transmitting unit 13a. Incidentally, when the radar device 10 is installed in a vehicle, the transmitting antenna 11 is placed, for example, to be directed toward the front of the vehicle (in the traveling direction).

The receiving antenna 12 is an antenna that receives a reflected wave, which a transmission wave transmitted from the transmitting antenna 11 is reflected by a target, and outputs a received signal to the receiving unit 13b of the control unit 13. Incidentally, when the radar device 10 is installed in a vehicle, the receiving antenna 12 is placed, for example, to be directed toward the front of the vehicle (in the traveling direction) in the same manner as the transmitting antenna 11.

A so-called array antenna in which multiple antennas are connected into an array shape can be used as the receiving antenna 12. In this case, respective signals received by the receiving antennas 12 are synthesized in the receiving unit 13b. By using an array antenna as the receiving antenna 12 in this way, a target can be captured more certainly.

The control unit 13 controls the entire radar device 10. The transmitting unit 13a generates a transmission wave signal which is frequency-modulated into a triangle wave, and outputs the generated transmission wave signal to the transmitting antenna 11. Incidentally, as described above, the transmission wave signal generated by the transmitting unit 13a is a digital signal, and is converted into an analog signal by the converter (not illustrated) placed between the transmitting antenna 11 and the transmitting unit 13a, and then the converted analog signal is transmitted from the transmitting antenna 11.

The receiving unit 13b calculates a difference between a reflected wave signal (an analog signal) received by the receiving antenna 12 and a transmission wave signal (an analog signal) transmitted from the transmitting antenna 11, and converts the difference into a digital signal. Then, the receiving unit 13b passes the converted digital signal to the frequency analyzing unit 13c. Incidentally, a difference between a reflected wave signal and a transmission wave signal is referred to as a "beat signal".

Figure 4A:
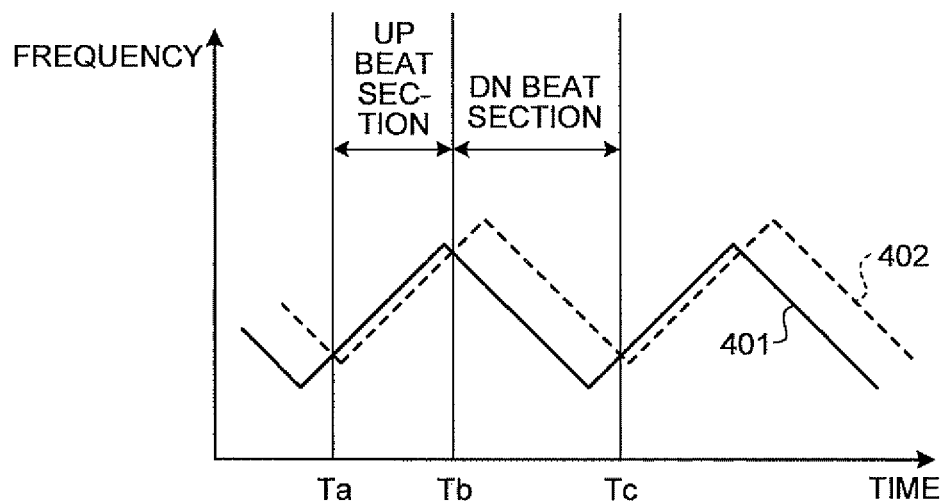
FIG. 4A is a first explanatory diagram of an FM-CW system.
Figure 4B:
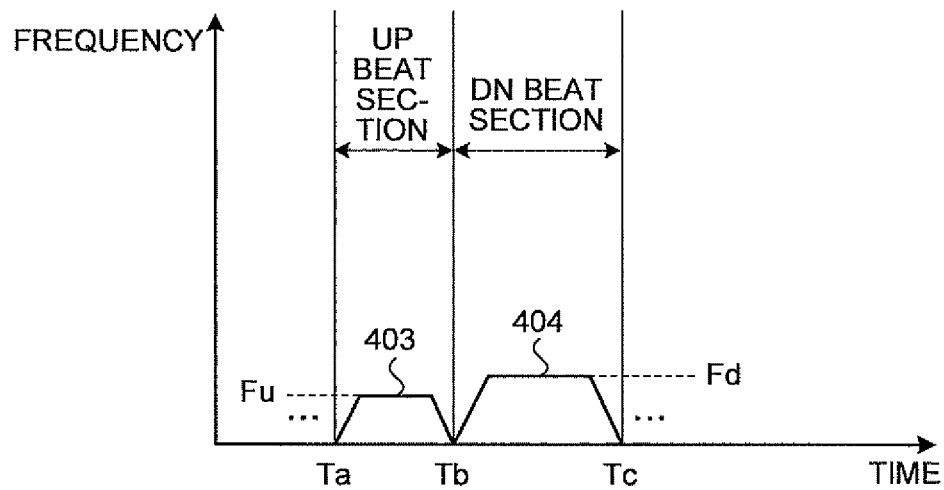
FIG. 4B is a second explanatory diagram of the FM-CW system.

Here, a process performed by the receiving unit 13b is explained with reference to FIGS. 4A and 4B. FIG. 4A is a first explanatory diagram of an FM-CW system, and FIG. 4B is a second explanatory diagram of the FM-CW system. Incidentally, FIG. 4A illustrates a transmission wave and a reflected wave, and FIG. 4B illustrates a beat signal. The diagrams in FIGS. 4A and 4B plot "time" on the abscissa and "frequency" on the ordinate.

As illustrated in FIG. 4A, when a transmission wave 401 which is frequency-modulated into a so-called triangle wave has been transmitted toward a target, a reflected wave 402 lagging behind the transmission wave 401 is observed. In triangle waves into which a transmission wave and a receiving wave are frequency-modulated, a section where the transmission wave and the receiving wave are up is an "UP beat section (upbeat section)", and a section where the transmission wave and the receiving wave are down is a "DN beat section (downbeat section)".

In the case illustrated in FIG. 4A, an interval from time "Ta" to time "Tb" corresponds to an UP beat section, and an interval from the time "Tb" to time "Tc" corresponds to a DN beat section. Then, by calculating an absolute value of a difference between the transmission wave 401 and the reflected wave 402, a beat signal illustrated in FIG. 4B is obtained.

As illustrated in FIG. 4B, the beat signal includes an UP beat signal 403 corresponding to the UP beat section and a DN beat signal 404 corresponding to the DN beat section. When the number of targets to be detected is one, as illustrated in FIG. 4B, a frequency representing the UP beat signal 403 is "Fu", and a frequency representing the DN beat signal 404 is "Fd". Therefore, by using these frequencies, a distance to the target and a relative velocity to the target can be calculated.

Specifically, when a distance to the target is denoted by "X", and a relative velocity to the target is denoted by "V", a distance "X" is expressed by "X=k1(Fu+Fd)/2", and a relative velocity "V" is expressed by "V=k2(Fu−Fd)/2". Incidentally, "k1" and "k2" are predetermined coefficients. As described above, the frequency "Fu" and the frequency "Fd" can be detected from the beat signal, and therefore the distance "X" and the relative velocity "V" can be calculated.

FIGS. 4A and 4B illustrate the case of one target; however, if there are multiple targets, the UP beat signal 403 and the DN beat signal 404 are observed as a synthetic wave that respective peak frequencies corresponding to the targets are synthesized. Therefore, as will be described later, a peak frequency corresponding to each target is detected by performing frequency analysis on each beat signal by use of Fast Fourier Transform (FFT) or the like.

To return to the explanation of FIG. 3, now continue the explanation of the control unit 13. The frequency analyzing unit 13c performs FFT on a beat signal received from the receiving unit 13b, thereby generating a frequency spectrum.

Incidentally, the frequency analyzing unit 13c generates respective frequency spectra of the UP beat signal 403 (see FIG. 4B) and the DN beat signal 404 (see FIG. 4B). Then, the frequency analyzing unit 13c passes the generated frequency spectra to the peak estimating unit 13d.

Figures 5, 6:
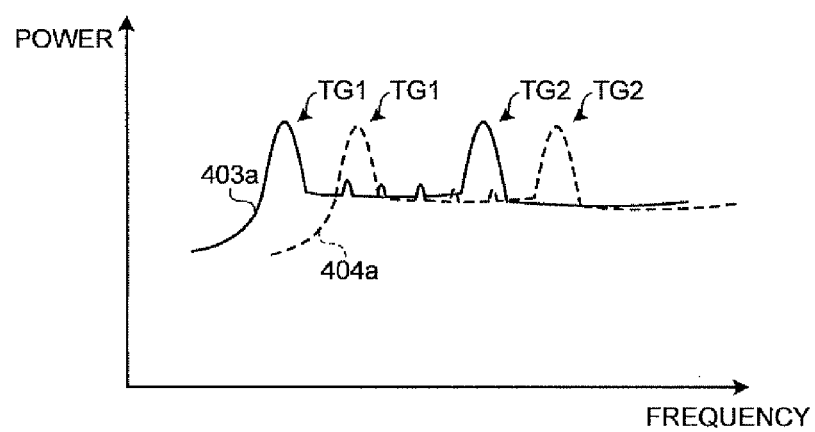
FIG. 5 is a diagram illustrating an example of frequency spectra.
FIG. 6 is a diagram illustrating an example of location information.

Here, an example of the frequency spectrum generated by the frequency analyzing unit 13c is explained with reference to FIG. 5. FIG. 5 is a diagram illustrating an example of the frequency spectra. Incidentally, the diagram in FIG. 5 plots "frequency" on the abscissa and "power" on the ordinate. Furthermore, FIG. 5 illustrates a case where there are peaks corresponding to two targets TG1 and TG2 on each of the frequency spectra.

The above-described frequency analyzing unit 13c generates an UP beat spectrum 403a, which is a frequency spectrum corresponding to the UP beat signal 403 (see FIG. 4B), and a DN beat spectrum 404a corresponding to the DN beat signal 404 (see FIG. 4B). Then, when having received the frequency spectra (the UP beat spectrum 403a and the DN beat spectrum 404a), the peak estimating unit 13d estimates respective peak frequencies corresponding to the targets with respect to each of the frequency spectra.

Incidentally, as illustrated in FIG. 5, when the targets are close, the UP beat spectrum 403a appears on the side of lower frequency than the DN beat spectrum 404a. Therefore, the DN beat spectrum 404a is less likely to have an overlap between a true peak corresponding to a target and a harmonic wave peak (not illustrated) than the UP beat spectrum 403a.

Therefore, the target determining unit 13e to be described later performs short-distance judgment by using the DN beat spectrum 404a; details of this will be described later with reference to FIG. 7. Incidentally, the target determining unit 13e can be configured not to perform the short-distance judgment. Furthermore, an angle to a target can be calculated by a general technique (for example, a mode vector method).

To return to the explanation of FIG. 3, now continue the explanation of the control unit 13. The peak estimating unit 13d estimates respective peak frequencies with respect to each of the frequency spectra received from the frequency analyzing unit 13c on the basis of the location information 14a stored in the storage unit 14. Incidentally, the peak estimating unit 13d also performs a normal peak detection process (for example, a process of detecting an upwardly-convex portion of a frequency spectrum as a peak).

Here, a peak-frequency estimating process performed by the peak estimating unit 13d is explained with reference to FIG. 6. FIG. 6 is a diagram illustrating an example of the location information 14a. As illustrated in FIG. 6, the location information 14a is information including, for example, a "target identifier" item, a "distance" item, a "relative velocity" item, an "angle" item, and a "priority" item.

Incidentally, in the location information 14a, information associated with a target by the target determining unit 13e is stored. Namely, information on a peak caused by a noise component is not stored in the location information 14a.

In the "target identifier" item, an identifier identifying a target is stored. In the "distance" item, a distance to the target calculated by the above-described equation is stored. In the "relative velocity" item, relative velocity to the target calculated by the above-described equation is stored. In the "angle" item, an angle to the target is stored. In the "priority" item, a priority indicating an order of priority of peak estimation is stored.

For example, a target which is assigned a target identifier "TG1" and whose priority is "1" is subjected to the estimating process in advance of a target which is assigned a target identifier "TG2" and whose priority is "2". In this manner, the estimating process is sequentially performed on targets in order of priority; therefore, for example, when there are many targets and there is not much time left to perform the process, a high-risk target (for example, a target likely to collide with the radar device 10) can be processed prior to low-risk targets.

Here, values of a target detected at a time "t−1" have been stored in the "distance" item and the "relative velocity" item in the location information 14a, respectively. Then, the above-described peak estimating unit 13d estimates a distance and a relative velocity at a time "t" from the distance and the relative velocity at the time "t−1".

Then, the peak estimating unit 13d estimates a peak frequency at the time "t" from the distance and the relative velocity at the time "t". A case of the target identifier "TG1" illustrated in FIG. 6 is explained below.

When a timestep is denoted by "T", and relative velocity is assumed to be invariable, the relative velocity at the time "t" is "V1", and the distance at the time "t" is "X1+T×V1 (V1 is a minus value)".

Therefore, by substituting "X1+T×V1" and "V1" for "X" in the above-described equation "X=k1(Fu+Fd)/2" and "V" in the equation "V=k2(Fu−Fd)/2", respectively, "Fu" and "Fd" are solved, so a peak frequency at the time "t" can be obtained.

Namely, a peak frequency "Fu" corresponding to the target TG1 on the UP beat spectrum 403a (see FIG. 5) and a peak frequency "Fd" corresponding to the target TG1 on the DN beat spectrum 404a (see FIG. 5) at the time "t" are obtained. Incidentally, as for the target identifier "TG2", respective peak frequencies are obtained in the same manner as the target identifier "TG1". In this manner, the peak estimating unit 13d estimates respective peak frequencies corresponding to each target.

To return to the explanation of FIG. 3, now continue the explanation of the control unit 13. The target determining unit 13e determines whether each peak frequency corresponds to a target by using the peak frequencies estimated by the peak estimating unit 13d and the frequency spectra generated by the frequency analyzing unit 13c.

Specifically, the target determining unit 13e compares power near each peak frequency on the UP beat spectrum 403a (see FIG. 5) with the predetermined threshold. Furthermore, the target determining unit 13e compares power near each peak frequency on the DN beat spectrum 404a (see FIG. 5) with the predetermined threshold.

Then, with respect to a certain target, for example, when powers near respective peak frequencies on the UP beat spectrum 403a and the DN beat spectrum 404a are both equal to or higher than the predetermined threshold, the target determining unit 13e determines that the peak frequencies are peak frequencies corresponding to the target.

Incidentally, when either one of powers near respective peak frequencies on the UP beat spectrum 403a and the DN beat spectrum 404a is equal to or higher than the predetermined threshold, the peak frequencies can be determined to be peak frequencies corresponding to the target.

In this manner, on the basis of the peak frequencies determined to correspond to the target, the target determining unit 13e updates the "distance" item, the "relative velocity" item, and the "angle" item in the location information 14a (see FIG. 6). Incidentally, respective methods of calculating a "distance", a "relative velocity", and an "angle" from the peak frequencies are already explained above, so the explanation of the methods is omitted here.

Furthermore, the target determining unit 13e also updates the "priority" item in the location information 14a. For example, the target determining unit 13e updates the "priority" item on the basis of respective distances to the targets in such a manner that the shorter the distance, the higher the priority.

Incidentally, with respect to each target identifier, a risk (for example, a value indicating the possibility of a collision with the radar device 10) can be calculated by using a "distance" as well as a "relative velocity" and an "angle", and the "priority" item can be updated on the basis of the calculated risks in such a manner that the higher the risk, the higher the priority.

In this case, a risk can be set in such a manner that the lower the angle, the higher the risk, or can be set in such a manner that the shorter the "distance after the elapse of the timestep" obtained from a distance and a relative velocity, the higher the risk. Furthermore, it can be configured to add weight to each of the calculated risks and set the sum of the weighted risks as a final risk.

Incidentally, in the short-distance judgment of whether a target is located at a short distance, when the target is judged to be located at a short distance, the target determining unit 13e performs the above-described determination based on power; this will be described later with reference to FIG. 7.

To return to the explanation of FIG. 3, now continue the explanation of the control unit 13. The output unit 13f outputs a result of the determination by the target determining unit 13e to an external device. Incidentally, in the present embodiment, there is described the case where the determination result is output to the external device; alternatively, a display unit or an annunciation unit can be installed in the radar device 10, and the determination result can be displayed on the display unit or be announced by annunciation unit.

The storage unit 14 is a storage device, such as a hard disk drive or a non-volatile memory, and stores therein the location information 14a. Incidentally, the location information 14a is already explained above with reference to FIG. 6, so the explanation of the location information 14a is omitted here.

Subsequently, an example of the short-distance judgment that the target determining unit 13e performs by using the DN beat spectrum 404a is explained with reference to FIG. 7. FIG. 7 is an explanatory diagram of the short-distance judgment based on an estimated DN peak value. The "estimated DN peak value" here means a value of an estimated peak frequency on the DN beat spectrum 404a. Incidentally, the diagram in FIG. 7 plots "frequency" on the abscissa and "power" on the ordinate.

Figure 7:
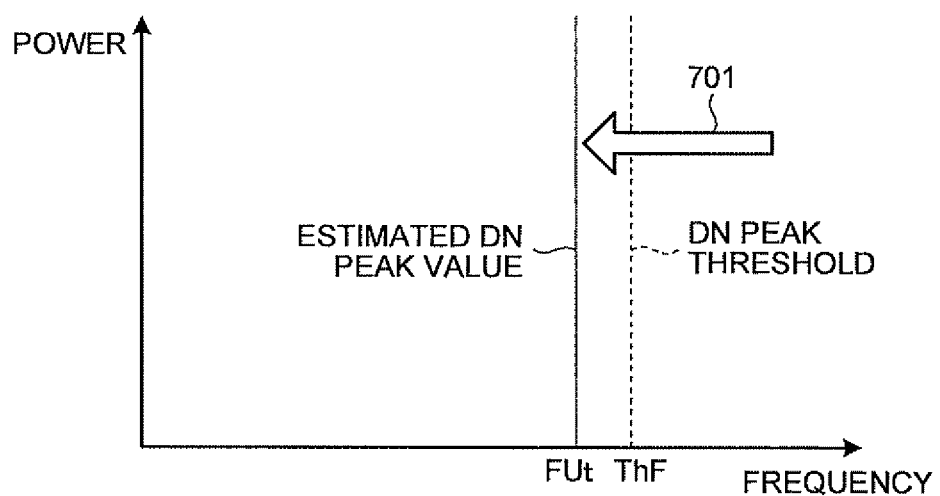
FIG. 7 is an explanatory diagram of short-distance judgment based on an estimated DN peak value.

As illustrated in FIG. 7, when a target comes close, an estimated DN peak value moves in a direction 701 with time. When an estimated DN peak value "FUt" received from the peak estimating unit 13d is equal to or lower than a predetermined DN peak threshold "ThF", the target determining unit 13e compares power near a peak frequency with the predetermined threshold.

The reason why the target determining unit 13e performs the judgment based on power when the target comes closer to some extent is as follows. Namely, as a distance to the target is greater, a peak frequency on a frequency spectrum gets higher, and a true peak gets farther away from a harmonic wave peak; therefore, the true peak can be detected even without performing peak estimation.

Incidentally, FIG. 7 illustrates the case where an estimated DN peak value is compared with the threshold; alternatively, the same effect can be achieved in a case where an estimated DN peak value is converted into a distance (see the explanation corresponding to FIG. 4B), and the converted distance is compared with a predetermined threshold.

Subsequently, a procedure of a process performed by the radar device 10 according to the present embodiment is explained with reference to FIG. 8. FIG. 8 is a flowchart illustrating the procedure of the process performed by the radar device 10.

As illustrated in FIG. 8, the frequency analyzing unit 13c generates a new frequency spectrum (Step S101). When having received the frequency spectrum generated by the frequency analyzing unit 13c, the peak estimating unit 13d estimates a peak frequency of each target on the basis of the location information 14a (Step S102).

Then, the target determining unit 13e compares the estimated DN peak frequency with a predetermined threshold (Step S103), and determines whether the estimated DN peak frequency is equal to or lower than the predetermined threshold (Step S104). Then, when the estimated DN peak frequency is equal to or lower than the predetermined threshold (YES at Step S104), the target determining unit 13e determines whether there is a peak near the estimated DN peak frequency (Step S105).

Incidentally, when the determination condition at Step S104 is not satisfied (NO at Step S104), the target determining unit 13e performs the normal peak detection process (Step S110), and updates the location information 14a (Step S109), and then ends the process.

When there is no peak near the estimated DN peak frequency (NO at Step S105), the target determining unit 13e determines whether power near the estimated peak frequency is equal to or higher than a predetermined threshold (Step S106). When power near the estimated peak frequency is equal to or higher than the predetermined threshold (YES at Step S106), the target determining unit 13e adopts the estimated peak frequency as a peak frequency (Step S107), and determines whether estimation of peak frequencies of all targets listed in the location information 14a has been completed (Step S108).

Incidentally, when the determination condition at Step S105 is satisfied (YES at Step S105), the target determining unit 13e performs the normal peak detection process using a peak near the estimated frequency (Step S110). Furthermore, when the determination condition at Step S106 is not satisfied (NO at Step S106), the target determining unit 13e performs the process at Step S108 without performing the process at Step S107.

Then, when estimation of peak frequencies of the all targets has been completed (YES at Step S108), the target determining unit 13e updates the location information 14a (Step S109), and ends the process. On the other hand, when the determination condition at Step S108 is not satisfied (NO at Step S108), the target determining unit 13e repeatedly performs the processes at Step S104 and subsequent steps.

As described above, in the present embodiment, a radar device including a generating unit (the frequency analyzing unit), an estimating unit (the peak estimating unit), and a determining unit (the target determining unit) is constructed. The generating unit generates a frequency spectrum from a beat signal corresponding to a predetermined period. The estimating unit estimates a peak frequency corresponding to a target on the basis of location information of the target corresponding to a past period. The determining unit determines, with respect to the frequency spectrum corresponding to the latest period, whether the peak frequency is a peak corresponding to the target by comparing power near the peak frequency estimated by the estimating unit with a predetermined threshold.

Therefore, the radar device according to the present embodiment is capable of improving the accuracy of detecting a target existing at a short distance.

Incidentally, in the above embodiment, there is described the case where the estimating unit estimates a peak frequency corresponding to a true peak; alternatively, the estimating unit can be configured to estimate respective peak frequencies of harmonic wave peaks and remove the harmonic wave peaks from a frequency spectrum. This way, even in a case of using a normal peak detection process (for example, a process of detecting an upwardly-convex portion of a frequency spectrum as a peak), it is easy to detect a peak frequency corresponding to a true peak.

Namely, for example, when a frequency spectrum includes a lot of noise, the influence of the noise can be efficiently eliminated from the frequency spectrum regardless of whether a target is at a short distance or a long distance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

As described above, the radar device according to the present invention is useful in improving the accuracy of detecting a target existing at a short distance, and is especially suited for tracking control of an object at a short distance as a target like vehicle congestion tracking.

What is claimed is:

1. A radar device comprising:
a generating unit that generates a frequency spectrum from a beat signal corresponding to a predetermined period "t;"
an estimating unit that estimates (i) a distance and a relative velocity of a target in the predetermined period "t" based on the distance and the relative velocity of the target in a past period "t−1," which precedes the predetermined period "t," and (ii) estimates a peak frequency corresponding to the target in the predetermined period "t" based on the distance and the relative velocity estimated by the estimating unit; and
a determining unit that determines, with respect to the frequency spectrum generated by the generating unit, a frequency equal to the estimated peak frequency in the frequency spectrum generated by the generating unit is a peak frequency corresponding to the target in the predetermined period "t" when power corresponding to the estimated peak frequency in the frequency spectrum generated by the generating unit is equal to or higher than a first predetermined threshold, wherein
the generating unit generates frequency spectra with respect to an upbeat section and a downbeat section in the beat signal corresponding to the predetermined period "t," respectively;
the estimating unit estimates respective peak frequencies on the frequency spectra based on a beat signal in the past period "t−1;" and
when the estimated peak frequency with respect to the downbeat section is equal to or lower than a fourth predetermined threshold, and power corresponding to the estimated peak frequency in one of the frequency spectra corresponding to the upbeat section and the downbeat section is equal to or higher than the first predetermined threshold, the determining unit determines that a frequency equal to the estimated peak frequency in each of the frequency spectra is a peak corresponding to the target.

2. The radar device according to claim 1, wherein
the estimating unit estimates the peak frequency in the predetermined period "t" by converting the distance and the relative velocity corresponding to the predetermined period "t" estimated on the basis of the distance and the relative velocity corresponding to the past period "t−1" into the peak frequency.

3. The radar device according to claim 2, wherein
when a distance to the target calculated based on a representative frequency in an upbeat section of the beat signal corresponding to the predetermined period "t" and a representative frequency in a downbeat section of the beat signal corresponding to the predetermined period "t" is equal to or lower than a second predetermined threshold, the determining unit determines whether a frequency equal to the estimated peak frequency in the frequency spectrum is the peak corresponding to the target in the predetermined period "t" by comparing the power corresponding to the estimated peak frequency in the frequency spectrum generated by the generating unit with the first predetermined threshold.

4. The radar device according to claim 2, wherein
when the peak frequency in the predetermined period "t" estimated by the estimating unit is equal to or lower than a third predetermined threshold, the determining unit determines whether a frequency equal to the estimated peak frequency in the frequency spectrum generated by the generating unit is a peak corresponding to the target in the predetermined period "t" by comparing the power with the first predetermined threshold.

5. A radar device comprising:

a generating means that generates a frequency spectrum from a beat signal corresponding to a predetermined period "t;"

an estimating means that estimates a distance and a relative velocity of a target in the predetermined period "t" based on the distance and the relative velocity of the target in a past period "t−1" which precedes the predetermined period "t," and estimates a peak frequency corresponding to the target in the predetermined period "t" based on the distance and the relative velocity estimated by the estimating means; and a determining means that determines, with respect to the frequency spectrum generated by the generating means, that the estimated peak frequency is a peak corresponding to the target in the predetermined period "t" when power corresponding to the estimated peak frequency in the frequency spectrum generated by the generating means is equal to or higher than a first predetermined threshold, wherein the generating means generates frequency spectra with respect to an upbeat section and a downbeat section in the beat signal corresponding to the predetermined period "t," respectively;

the estimating means estimates respective peak frequencies on the frequency spectra based on a beat signal in the past period "t−1;" and when the estimated peak frequency with respect to the downbeat section is equal to or lower than a fourth predetermined threshold, and power corresponding to the estimated peak frequency in one of the frequency spectra corresponding to the upbeat section and the downbeat section is equal to or higher than the first predetermined threshold, the determining means determines that a frequency equal to the estimated peak frequency in each of the frequency spectra is a peak corresponding to the target.

\* \* \* \* \*